United States Patent
Fujiwara et al.

(10) Patent No.: US 7,641,730 B2
(45) Date of Patent: Jan. 5, 2010

(54) GLASS FLAKE AND METHOD OF MANUFACRTURING THE SAME

(75) Inventors: Kosuke Fujiwara, Minato-ku (JP); Makoto Umino, Minato-ku (JP); Akihiro Koyama, Minato-ku (JP); Haruki Niida, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 386 days.

(21) Appl. No.: 10/541,602

(22) PCT Filed: Feb. 27, 2004

(86) PCT No.: PCT/JP2004/002421

§ 371 (c)(1),
(2), (4) Date: Jul. 7, 2005

(87) PCT Pub. No.: WO2004/076372

PCT Pub. Date: Sep. 10, 2004

(65) Prior Publication Data

US 2006/0048679 A1    Mar. 9, 2006

(30) Foreign Application Priority Data

Feb. 27, 2003    (JP) .............................. 2003-050415

(51) Int. Cl.
C04C 14/04    (2006.01)
C03C 3/062    (2006.01)
C03C 8/00    (2006.01)
C03C 8/02    (2006.01)

(52) U.S. Cl. ............................ 106/482; 501/14; 501/21; 501/19; 501/68; 501/69; 501/70; 501/71; 65/73; 428/406

(58) Field of Classification Search .................. 501/14, 501/21, 19, 68–71, 73; 65/33.1, 32.1, 111; 106/481, 482
See application file for complete search history.

(56) References Cited

U.S. PATENT DOCUMENTS 3,331,699 A * 7/1967 Marshall et al. ............. 106/415
3,694,360 A * 9/1972 Weaver .................... 252/62.59
3,929,497 A * 12/1975 Clark-Monks ................. 501/5

(Continued)

FOREIGN PATENT DOCUMENTS

EP    1 340 715    9/2003

(Continued)

OTHER PUBLICATIONS

STIC search result, Sep. 16, 2009.*

*Primary Examiner*—Jerry Lorengo
*Assistant Examiner*—Pegah Parvini
(74) *Attorney, Agent, or Firm*—Hamre, Schumann, Mueller & Larson, P.C.

(57) ABSTRACT

The present invention provides a glass flake having sufficiently high visible-light absorptivity. The glass flake of the present invention includes a glass composition that contains a transition metal oxide such as an iron oxide and that allows the glass flake to have a visible-light transmittance of 85% or lower measured with an A light source when the glass flake has a thickness of 15 μm. In this glass composition, it is preferable that the content of $Fe_2O_3$ ($T-Fe_2O_3$) in terms of the total iron satisfies the following formula, expressed in mass %: $10 < T-Fe_2O_3 \leq 50$.

16 Claims, 7 Drawing Sheets

U.S. PATENT DOCUMENTS

| | | |
|---|---|---|
| 5,696,039 A | 12/1997 | Sugawara |
| 5,753,371 A * | 5/1998 | Sullivan et al. ............. 428/406 |
| 6,340,646 B1 * | 1/2002 | Nagashima et al. ........... 501/64 |
| 6,914,371 B2 | 7/2005 | Martin et al. |
| 2001/0021685 A1 * | 9/2001 | Sakaguchi et al. ............ 501/64 |
| 2003/0044711 A1 * | 3/2003 | Hutcheson ............. 430/111.31 |

FOREIGN PATENT DOCUMENTS

| | | | |
|---|---|---|---|
| JP | 63-201041 | | 8/1988 |
| JP | 63-307142 | | 12/1988 |
| JP | 3-40938 | | 2/1991 |
| JP | 5-826 | | 1/1993 |
| JP | 05017710 | * | 1/1993 |
| JP | 06-116510 A | | 4/1994 |
| JP | 7-330361 | | 12/1995 |
| JP | 9-71436 | | 3/1997 |
| JP | 9-110453 | | 4/1997 |
| JP | 5017710 | * | 1/1999 |
| JP | 2000-219534 | * | 8/2000 |
| JP | 2000323071 | * | 11/2000 |
| JP | 2001-31421 | | 2/2001 |
| JP | 2001-213639 | | 8/2001 |
| JP | 2002-226732 A | | 8/2002 |
| JP | 2003-526187 | | 9/2003 |

* cited by examiner

GLASS FLAKE AND METHOD OF MANUFACRTURING THE SAME

TECHNICAL FIELD

The present invention relates to a glass flake excellent in visible-light absorptivity and a method of manufacturing the same. Furthermore, the present invention relates to a resin composition, a paint, and a cosmetic product that contain the glass flake.

BACKGROUND ART

When being mixed in a resin matrix, glass flakes improve the strength and dimensional accuracy of resin molded products. Glass flakes are used as pigments, are mixed in cosmetics, or are mixed, as a lining material, in paints that are to be applied onto surfaces of substrates such as, for instance, metals and concretes.

Glass flakes exhibit a metallic color when their surfaces are coated with a metal. Glass flakes also exhibit an interference color that is obtained through the interference of reflected light, when their surfaces are coated with a metal oxide. The glass flakes having a coating film formed of a metal or a metal oxide are preferred for use in applications such as paints and cosmetics where color tones and glossiness are regarded as important.

JP63(1988)-201041A discloses C-glass, E-glass, and sheet-glass compositions as those suitable for glass flakes. JP9(1997)-110453A discloses alkali-resistant glass flakes. JP2001-213639A discloses glass flakes having excellent chemical resistance and strength. JP63(1988)-307142A and JP3(1991)-40938A describe glass flakes with high ultraviolet absorptivity.

Glass flakes that have a surface coated with a metal or a metal oxide and that have improved colorability, light reflectivity, and shielding ability have been commercially available. For example, JP2001-31421A discloses a method of depositing rutile titanium dioxides and glass flakes with the rutile titanium dioxides deposited thereon.

Glass containing a large amount of transition metal oxides therein, which is not a glass flake though, has been known as glass with low visible-light transmittance. For instance, JP9 (1997)-71436A describes absorber glass or fiber optic plate glass that has a wide absorption band extending from the ultraviolet region to the near infrared region. This absorber glass or fiber optic plate glass has a composition including $La_2O_3$ and BaO. JP2003-526187A describes a glass spacer. This glass spacer contains BaO or/and $La_2O_3$.

In the conventional glass flakes described above, no consideration was given to the visible-light absorptivity of the glass flakes themselves. The glass flakes contain a small amount of components that absorb visible light. Glass flakes disclosed in JP63(1988)-307142A and JP3(1991)-40938A exhibit excellent absorption properties with respect to the regions extending from the ultraviolet region to near ultraviolet region. However, they also contain a small amount of components that absorb visible light.

Accordingly, when a coating film is formed of a translucent material on the surfaces of conventional glass flakes, a color affected by the color of the substrates may develop. This is because the glass flakes hardly absorb visible light.

Figure 7:
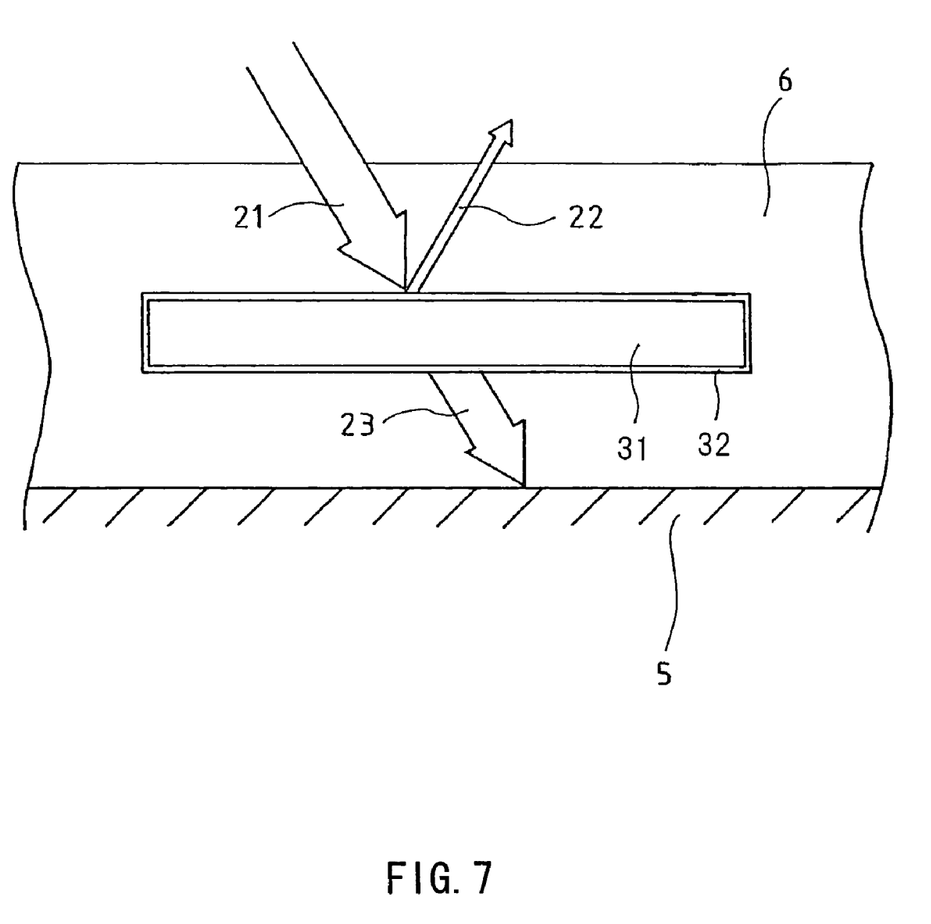
FIG. 7 is a cross-sectional view showing the state where a paint containing a conventional glass flake has been applied to a substrate.

This phenomenon is described with reference to FIG. 7. A glass flake 31 has a translucent metal oxide film 32 on its surface. The glass flake 31 has been mixed as a pigment in a paint 6. The glass flake 31 itself has little visible-light absorptivity and the metal oxide film 32 is translucent. Accordingly, part of the light 21 that is incident on the glass flake is reflected, which becomes reflected light 22, but most part thereof is transmitted through the glass flake, which becomes transmitted light 23. The transmitted light 23 is reflected by the surface of a substrate 5, which becomes reflected light affected by the color of the surface.

DISCLOSURE OF THE INVENTION

The present invention is intended to provide a glass flake with sufficiently high visible-light absorptivity.

The glass flake of the present invention includes a glass composition that includes a transition metal oxide and that allows the glass flake to have a visible-light transmittance, measured with an A light source, of 85% or lower, preferably 50% or lower, and particularly 5% or lower, when the glass flake has a thickness of 15 μm.

BRIEF DESCRIPTION OF DRAWINGS

FIG. 1A is a perspective view showing an embodiment of a glass flake according to the present invention while

BEST MODE FOR CARRYING OUT THE INVENTION

Figure 1A:
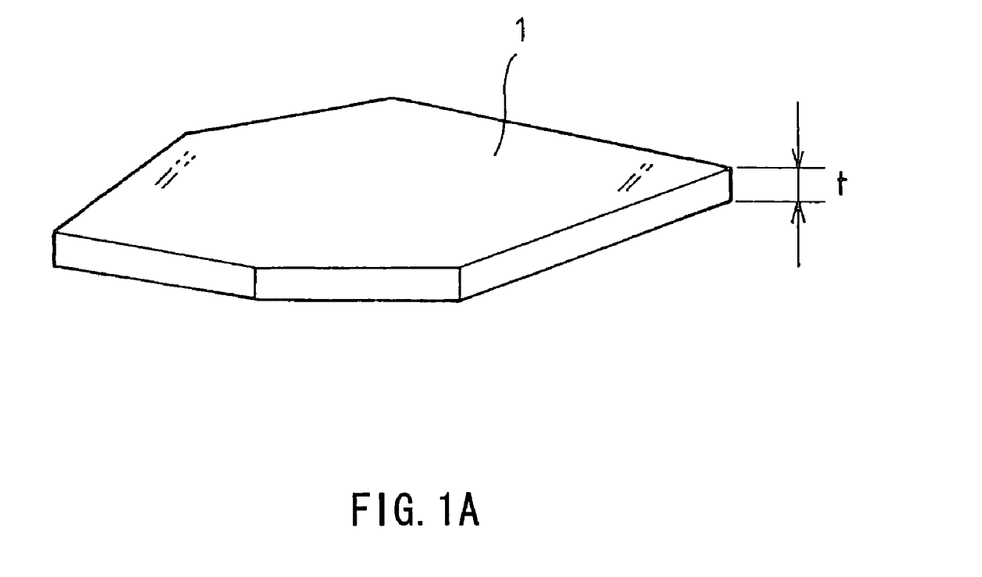
Figure 1B:
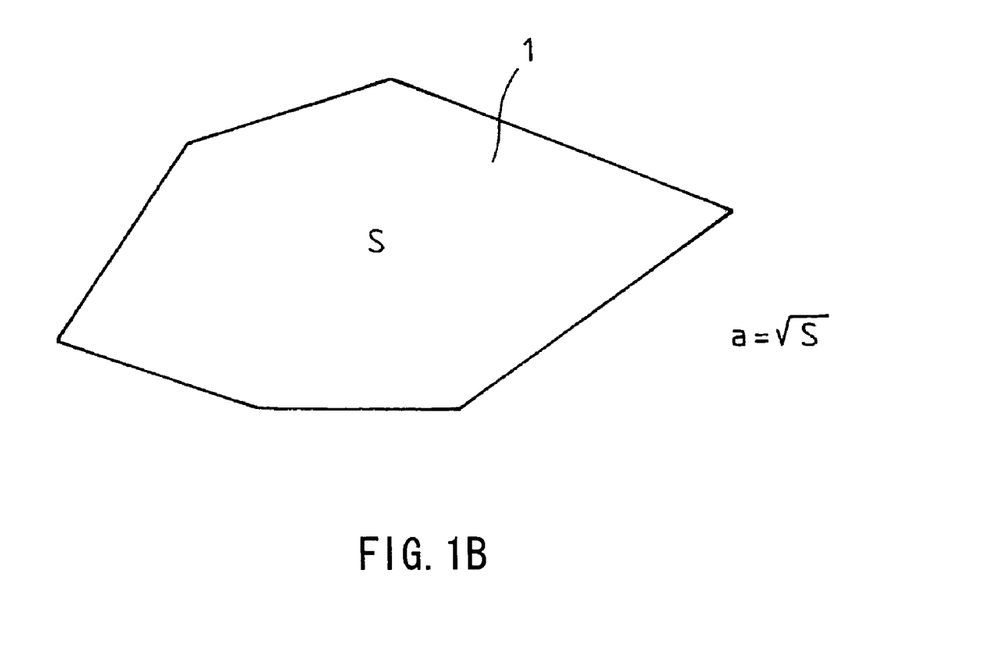
FIG. 1B is a plan view of the embodiment.

In the present specification, a glass flake 1 denotes a flake-like particle having an average thickness t of at least 0.1 μm but less than 100 μm and an aspect ratio (a mean particle diameter a/an average thickness t) of 2 to 1000 (see FIG. 1A). In this context, the mean particle diameter a is defined as the square root of the area S of the glass flake 1 viewed in plan (see FIG. 1B).

In the glass flake of the present invention, the glass composition contains, as a transition metal oxide, an oxide of at least one selected from Fe, Co, Ti, Ni, Cr, and Mn, particularly Fe.

In a preferable embodiment of the present invention, the glass composition further includes $SiO_2$ and an alkali metal oxide, and includes more than 10 mass % of the transition metal oxide.

Preferably, this glass composition includes the following components, expressed in mass %:

$20 \leq SiO_2 \leq 70$;

$10 < T-Fe_2O_3 \leq 50$; and $5 \leq (Li_2O + Na_2O + K_2O) \leq 50$.

In the present specification, "T-Fe$_2$O$_3$" denotes Fe$_2$O$_3$ whose amount is calculated from the total content of iron contained in the glass composition.

In another preferable embodiment of the present invention, the glass composition further includes SiO$_2$ and an alkaline-earth metal oxide, and contains more than 10 mass % of the transition metal oxide.

Preferably, this glass composition includes the following components, expressed in mass %:

20≦SiO$_2$≦70;
10<T-Fe$_2$O$_3$≦50; and
5≦(MgO+CaO+SrO)≦50.

In still another preferable embodiment of the present invention, the glass composition further includes SiO$_2$, an alkali metal oxide, and an alkaline-earth metal oxide, and contains more than 10 mass % of the transition metal oxide.

Preferably, this glass composition includes the following components, expressed in mass %:

20≦SiO$_2$≦70;
10<T-Fe$_2$O$_3$≦50;
0<(Li$_2$O+Na$_2$O+K$_2$O)<50;
0<(MgO+CaO+SrO)<50; and
5≦(Li$_2$O+Na$_2$O+K$_2$O+MgO+CaO+SrO)≦50.

In the respective embodiments described above, the glass composition further may include other components. Examples of such other components include Al$_2$O$_3$, B$_2$O$_3$, TiO$_2$, CoO, and ZrO$_2$.

For instance, the glass composition further may include at least one selected from the following components, expressed in mass %:

0≦Al$_2$O$_3$≦10;
0≦B$_2$O$_3$≦10;
0≦TiO$_2$≦10;
0≦CoO≦20; and
0≦ZrO$_2$≦10.

The amount of each component of Al$_2$O$_3$, B$_2$O$_3$, TiO$_2$, CoO, and ZrO$_2$ that is contained in the glass composition may be, for example, at least 1 mass %.

Preferably, the glass flake of the present invention further includes metal oxide crystals. It is preferable that the metal oxide crystals contain Fe as a constituent atom. The metal oxide crystals further can improve the visible-light absorptivity of the glass flake. The metal oxide crystals may be those of at least one selected from Fe$_2$O$_3$ (diiron trioxide) and Fe$_3$O$_4$ (triiron tetroxide).

When the glass composition includes an oxide of Fe as the transition metal oxide, the Fe preferably satisfies a formula of $0.05 \leq Fe^{2+}/(Fe^{2+}+Fe^{3+}) < 1.00$, more preferably a formula of $0.10 \leq Fe^{2+}/(Fe^{2+}+Fe^{3+}) \leq 0.80$. The ratio of $Fe^{2+}/(Fe^{2+}+Fe^{3+})$ is expressed in terms of the mass ratio to be exact although no substantial difference results from the selection of either the atomic ratio or the mass ratio.

A coating film may be formed on the surface of the glass flake. Preferably, the glass flake of the present invention further includes a coating film that is formed on the surface of the glass flake and that contains at least one selected from a metal and a metal oxide. Preferably, the metal is at least one selected from nickel, gold, silver, platinum, and palladium. It is preferable that the metal oxide be an oxide of at least one selected from titanium, aluminum, iron, cobalt, chromium, zirconium, zinc, and tin.

Since the glass flake of the present invention has high shielding ability, the color of the coating is not affected considerably by the color of the substrate surface even if a translucent coating film is formed on the glass surface. A typical translucent coating film may be one made of titanium dioxide. The glass flake of the present invention, however, may be used, with another coating film formed thereon or with no coating film formed thereon.

From another aspect, the present invention provides various products including the glass flakes described above, for instance, resin compositions, paints, and cosmetics.

The present invention further provides a method of manufacturing a glass flake. The method includes a process of heat-treating a glass flake containing Fe to change the valence of at least part of the Fe, i.e. to change the value of $[Fe^{2+}/(Fe^{2+}+Fe^{3+})]$, and thereby to vary the color tone of the glass flake.

The present invention further provides another method of manufacturing a glass flake. The method includes a process of heat-treating a glass flake containing Fe to form oxide crystals of the Fe in the glass flake.

In the respective processes described above, it is preferable that the heat-treating be carried out in an atmosphere where the Fe is to be oxidized or reduced.

Furthermore, it is preferable that the heat-treating include a first heat treatment and a second heat treatment that are carried out sequentially in an atmosphere where the Fe is to be oxidized and in an atmosphere where the Fe is to be reduced, respectively.

Each component of the glass composition is described below.

SiO$_2$

Silicon dioxide (SiO$_2$) is a main component of a glass skeleton. When the content of SiO$_2$ is less than 20 mass %, a glass skeleton is hard to form. On the other hand, a SiO$_2$ content exceeding 70 mass % results in an extremely high melting point of glass, which causes difficulty in melting raw materials uniformly. Preferably, the content of SiO$_2$, expressed in mass %, is in the range of 20≦SiO$_2$≦70, particularly 40≦SiO$_2$≦70.

Fe

When present in glass, iron (Fe) normally exists in the state of an iron oxide (Fe$_2$O$_3$ or FeO). Fe$_2$O$_3$ has an effect of improving ultraviolet absorption properties of glass. FeO has an effect of improving infrared absorption properties of glass. In both the states, the iron oxide contributes to visible-light absorption.

In the case where no other coloring component is contained, when the content of T-Fe$_2$O$_3$ is 10 mass % or less, the visible-light transmittance of a glass flake (with a thickness of 0.1 to 15 μm) exceeds 85%. On the other hand, when the content of T-Fe$_2$O$_3$ exceeds 50 mass %, the contents of the other components decrease relatively, which results in difficulty in forming glass. Particularly, when substantially iron alone is contained as a coloring component, it is preferable that the content of T-Fe$_2$O$_3$, expressed in mass %, be in the range of 10<T-Fe$_2$O$_3$≦50, further 15≦T-Fe$_2$O$_3$≦50, and particularly 18≦T-Fe$_2$O$_3$≦50.

Alkali Metal Oxide

Alkali metal oxides (Li$_2$O, Na$_2$O, and K$_2$O) are components that adjust the devitrification temperature and viscosity in forming glass.

In the case where no alkaline-earth metal oxides are contained, when the content of alkali metal oxides exceeds 50 mass %, the devitrification temperature rises and thereby it becomes difficult to form glass. On the other hand, when the content of alkali metal oxides is less than 5 mass %, the contents of the other components relatively increase to become excessively high, which makes it difficult to form glass. The content of alkali metal oxides, expressed in mass %, is preferably in the range of $5 \leq (Li_2O+Na_2O+K_2O) \leq 50$.

Alkaline-Earth Metal Oxide

Alkaline-earth metal oxides (MgO, CaO, and SrO) also are components that adjust the devitrification temperature and viscosity in forming glass.

In the case where no alkali metal oxides are contained, when the content of alkaline-earth metal oxides is less than 5 mass % or exceeds 50 mass %, it becomes difficult to form glass for the same reason as in the case of the alkali metal oxides. The content of alkaline-earth metal oxides, expressed in mass %, is preferably in the range of $5 \leq (MgO+CaO+SrO) \leq 50$.

BaO is one of the alkaline-earth metal oxides. It, however, is preferable that the glass composition be substantially free from BaO. In the present specification, the expression of "substantially free" denotes that the content concerned is less than 0.5 mass %.

$Al_2O_3$

Aluminum oxide ($Al_2O_3$) is not an essential component but is a component that adjusts the devitrification temperature and viscosity in forming glass. When the content of $Al_2O_3$ exceeds 10 mass %, the devitrification temperature rises and thereby it becomes difficult to form glass. Preferably, the content of $Al_2O_3$, expressed in mass %, is in the range of $0 \leq Al_2O_3 \leq 10$.

$B_2O_3$

Diboron trioxide ($B_2O_3$) is not an essential component. It, however, is a component that lowers the melting point of glass and also is a component that inhibits glass from being crystallized. The use of such properties facilitates the formation of glass. It is advantageous to set the content of $B_2O_3$ in the range in which the contents of the other components are not limited considerably, i.e. 10 mass % or less. Preferably, the content of $B_2O_3$, expressed in mass %, is in the range of $0 \leq B_2O_3 \leq 10$.

$TiO_2$ and $ZrO_2$

Titanium oxide ($TiO_2$) and zirconium oxide ($ZrO_2$) each are not an essential component but can be used as a nucleus forming agent for forming crystals uniformly in glass. Hence, when metal oxide crystals are to be formed in glass, it is advantageous for glass to contain at least one selected from $TiO_2$ and $ZrO_2$. $TiO_2$ also is a component that improves ultraviolet absorption properties of glass.

When the contents of $TiO_2$ and $ZrO_2$ each exceed 10 mass %, the devitrification temperature of glass rises, which makes it difficult to form glass. Preferably, the contents of $TiO_2$ and $ZrO_2$, expressed in mass %, are in the ranges of $0 \leq TiO_2 \leq 10$ and $0 \leq ZrO_2 \leq 10$, respectively.

CoO

Cobalt oxide is not an essential component but a component that improves visible-light absorptivity of glass. However, when the content thereof exceeds 20 mass %, the devitrification temperature of glass rises, which makes it difficult to form glass. Accordingly, it is preferable that the content of CoO, expressed in mass %, be in the range of $0 \leq CoO \leq 20$.

The glass flake of the present invention may be substantially free from $La_2O_3$.

Glass flakes having the compositions described above do not break easily even when having an average thickness of 0.1 µm to 100 µm. The adjustment of their diameters therefore is basically optional.

In the glass flake of the present invention, the visible-light transmittance that is measured using the A light source can be decreased to 85% or lower in terms of a thickness of 15 µm even in a plain state where the surface of the glass flake has not been coated with a metal or a metal oxide. Accordingly, the glass flake of the present invention can exhibit such high visible-light absorptivity, i.e. high shielding properties, as not to be comparable with conventional glass flakes.

Figure 2:
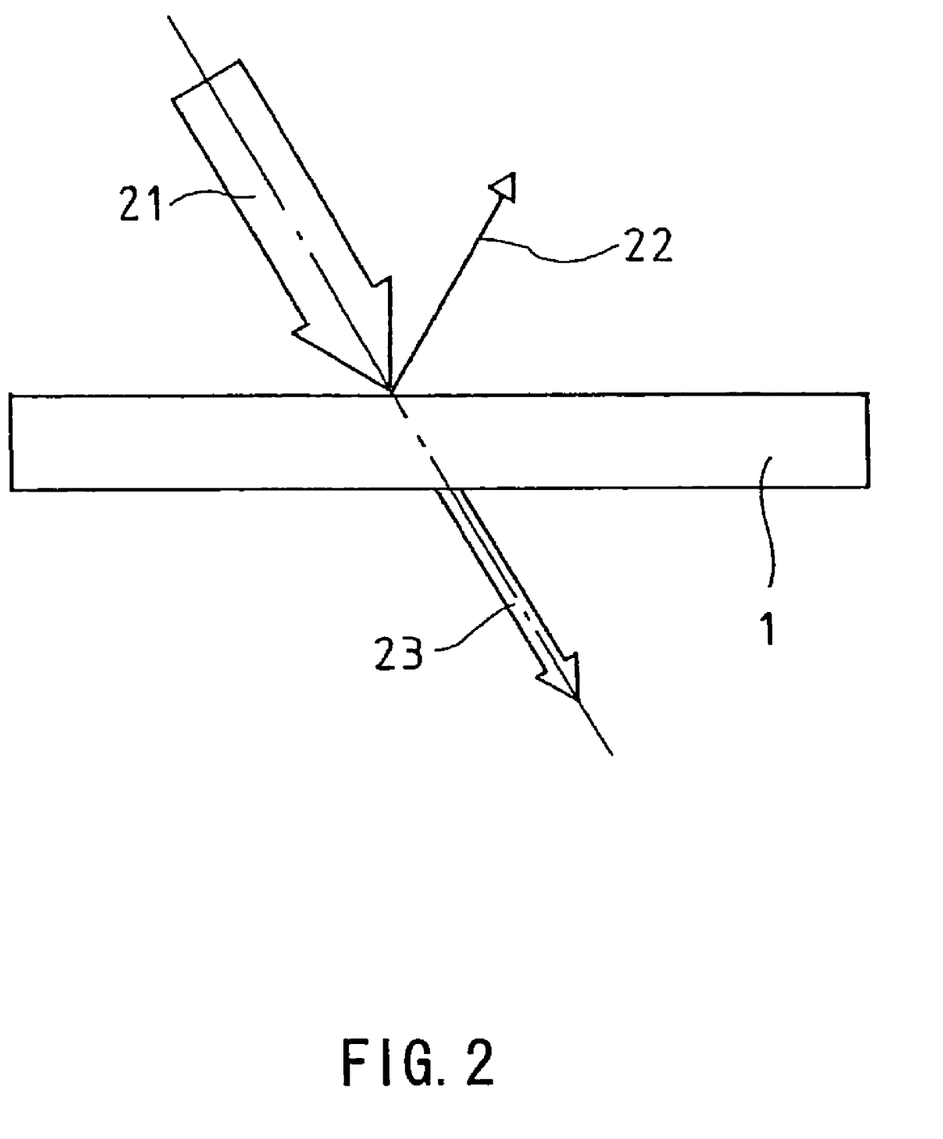
FIG. 2 is a cross-sectional view showing an embodiment of a glass flake according to the present invention, which is used for explaining the transmission, reflection, and absorption of visible light that is incident on the glass flake.

As shown in FIG. 2, most of the light 21 that is incident on a glass flake 1 of the present invention is absorbed by the glass flake 1. A part of the light 21 is transmitted as transmitted light 23 and another part thereof is reflected as reflected light 22 by the surface of the glass flake 1.

Figure 3:
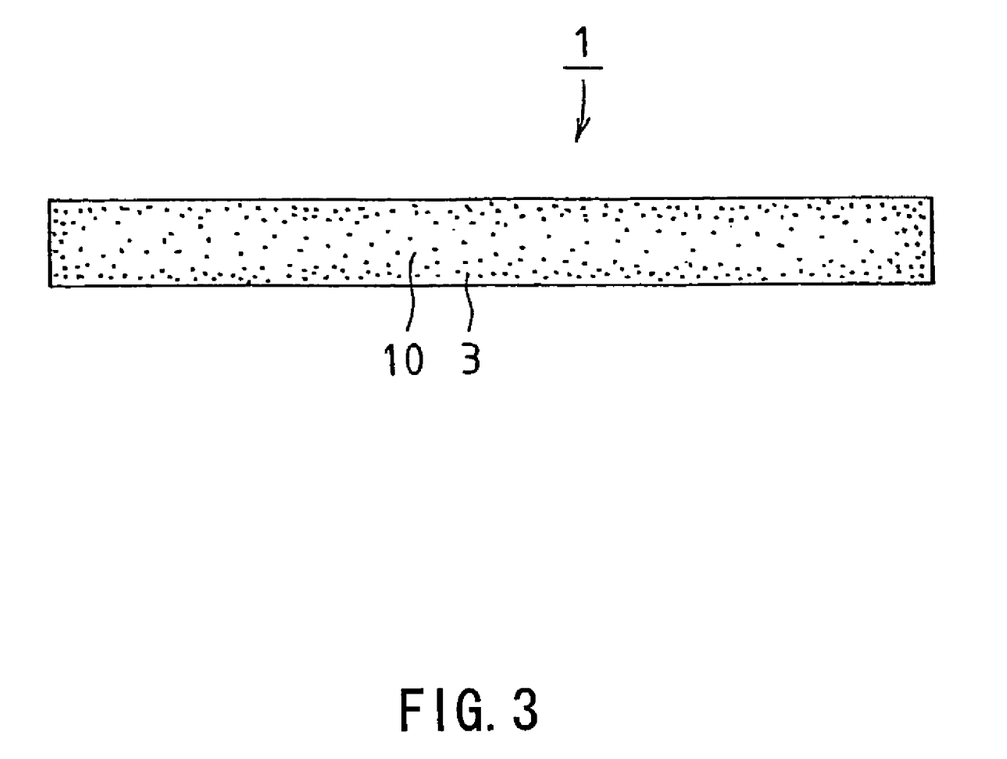
FIG. 3 is a cross-sectional view showing a glass flake containing metal oxide crystals that is an embodiment of the glass flake according to the present invention.

As shown in FIG. 3, metal oxide crystals 3 may be formed in a glass matrix 10 of a glass flake 1. When the metal oxide crystals 3 containing Fe as a constituent atom are formed in the glass matrix 10 of the glass flake, the visible-light transmittance decreases. Control of the amount and grain size of the metal oxide crystals 3 formed in the glass matrix 10 allows the visible-light transmittance of the glass flake to be adjusted readily. In this case, it is preferable that major crystals formed in the glass matrix 10 be $Fe_2O_3$ or $Fe_3O_4$. The glass matrix 10 further may include crystals of Fe and/or FeO. The metal and/or metal oxide crystals formed in the glass flake may be observed with an electron microscope. In addition, the phase separation structure caused in the glass flake also may be observed with the electron microscope in some cases.

The visible-light transmittance of the glass composition containing the metal oxide crystals 3 surely decreases to 50% or lower in terms of a thickness of 15 µm. When the composition of the glass matrix 10 is adjusted, it also is possible to decrease the visible-light transmittance to 10% or lower, further 5% or lower.

When a produced glass flake 1 is subjected to a heat treatment in which it is heated to a temperature between around the glass-transition temperature and around the glass-softening point and is maintained in that state, the metal oxide crystals 3 can be formed and are allowed to increase in size and number. The metal oxide crystals 3 also can be formed through a suitable adjustment of heat treatment conditions such as, for instance, a temperature at which melted glass is maintained in producing the glass flake 1.

The heat treatment employed in the manufacturing method of the present invention is carried out in an atmosphere where Fe contained in the glass flake is to be oxidized and/or an atmosphere where the Fe is to be reduced, and thereby the visible-light transmittance and color tone of the glass flake can be adjusted. Furthermore, the heat treatment allows iron oxide crystals to be formed.

The atmosphere where the Fe contained in the glass flake is to be oxidized is an oxidizing atmosphere. An oxidizing gas such as air or an oxygen gas may be used as the atmosphere.

The atmosphere where the Fe contained in the glass flake is to be reduced can be any atmosphere as long as it is one of a reducing atmosphere and an inert atmosphere. It is advantageous to use a reducing gas such as, for instance, a mixed gas containing hydrogen, for the reducing atmosphere. It is advantageous to use an inert gas such as, for instance, a nitrogen gas, a helium gas, or an argon gas, for the inert atmosphere.

The heat treatment can be carried out multiple times. In that case, it is preferable that the oxidizing or reducing atmosphere be changed to the other for each heat treatment. The oxidizing or reducing atmosphere may be changed to the other during a single heat treatment. Furthermore, it is preferable that the heat treatment be carried out in an atmosphere where at least Fe contained in the glass flake is to be reduced. More preferably, after a heat treatment is carried out in an oxidizing atmosphere, another heat treatment is carried out in a reducing or inert atmosphere.

The ratio of $Fe^{2+}$ and $Fe^{3+}$ that are contained in the glass flake of the present invention is preferably in the range of $0.05 \leq Fe^{2+}/(Fe^{2+}+Fe^{3+}) < 1.00$, more preferably in the range of $0.10 \leq Fe^{2+}/(Fe^{2+}+Fe^{3+}) \leq 0.80$. The glass flake in which the ratio is in the range described above exhibits a darker color tone and high visible-light absorption properties. In addition, the ratio included in the range described above facilitates the formation of iron oxide crystals, particularly $Fe_3O_4$ crystals.

Figure 4:
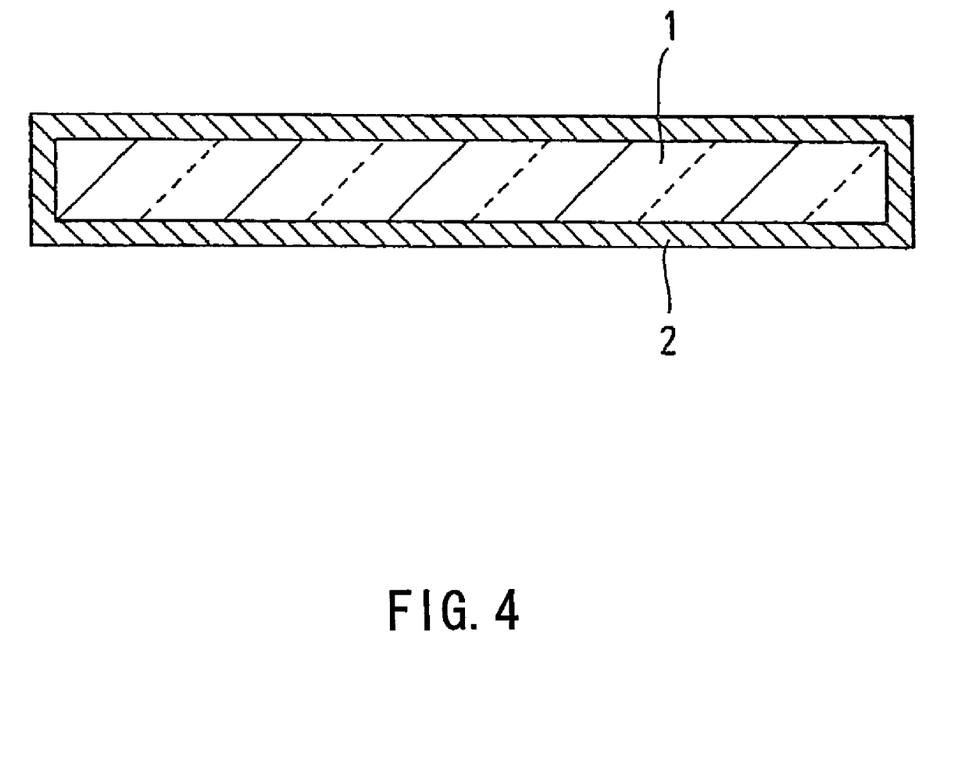
FIG. 4 is a cross-sectional view showing a glass flake having a coating film that is an embodiment of the glass flake according to the present invention.

As shown in FIG. 4, a coating film 2 of a metal or a metal oxide may be formed on the surface of a glass flake 1, with the glass flake 1 serving as a substrate. Examples of the metal include silver, gold, platinum, palladium, and nickel. The glass flake 1 may be coated with a single or mixed layer or multiple layers of such metals. Nickel that has a high function of shielding a base material is preferable as the metal. The glass flake 1 may be coated with a single or mixed layer or multiple layers of metal oxides such as, for instance, titanium dioxides, aluminum oxides, iron oxides, chromium oxides, cobalt oxides, zirconium oxides, zinc oxides, or tin oxides.

Titanium dioxide that has high refractive index and transparency and that allows interference colors to have good color development is preferable as the metal oxide. Furthermore, such a metal thin film and a metal oxide thin film may be stacked sequentially.

Figure 5:
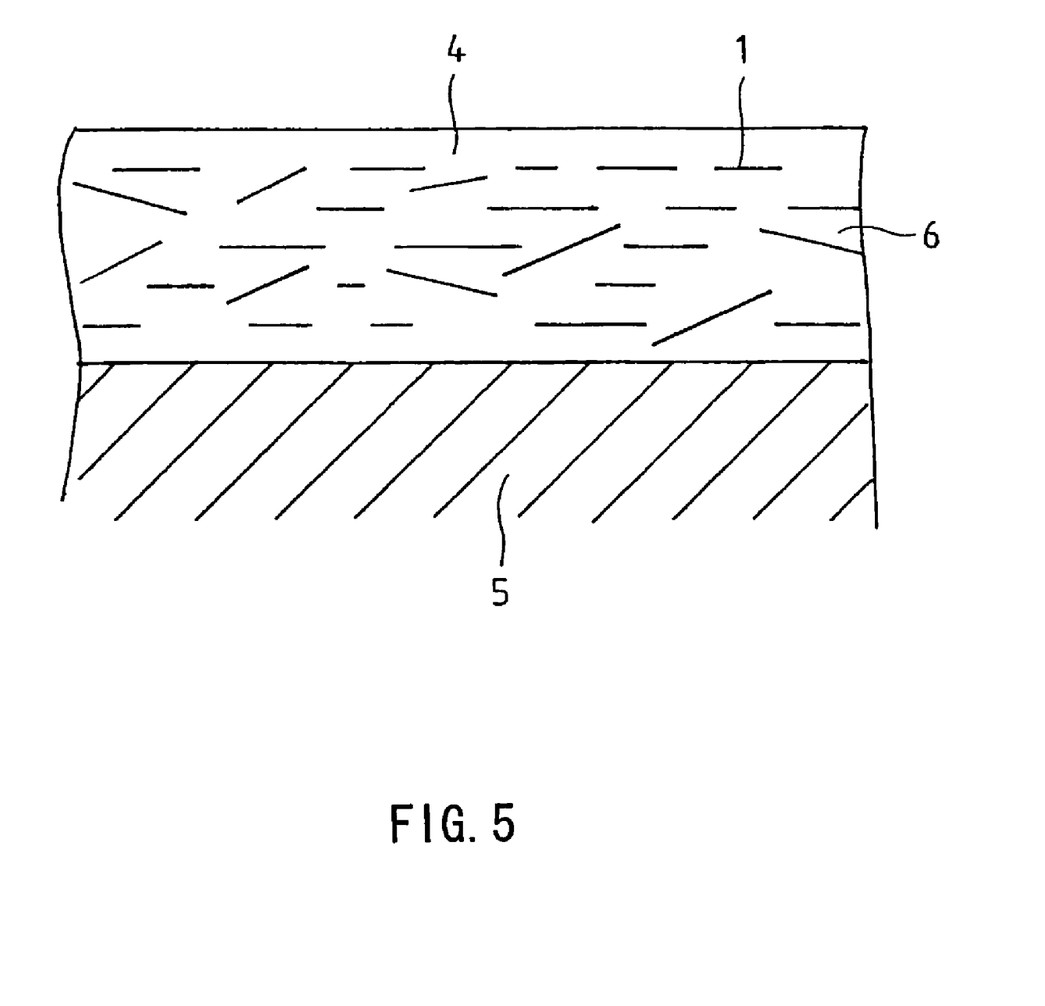
FIG. 5 is a cross-sectional view showing the state where a resin composition of the present invention has been applied to a substrate.

This glass flake is mixed in resin compositions, paints, cosmetics, etc. as a pigment or reinforcing filler by a well-known method and thereby improves color tones and glossiness thereof as well as the dimensional accuracy and strength. As shown in FIG. 5, for instance, glass flakes 1 are mixed in a paint, which then is applied onto the surface of a substrate 5. The glass flakes 1 are dispersed in a resin matrix 4 of a coating 6.

EXAMPLES

General glass materials such as silica sand were blended so that the compositions shown in Tables 1 to 3 were obtained, and batches of respective examples and comparative examples were prepared. These batches were heated to 1400° C. to 1500° C. to melt in an electric furnace, which then were maintained in that state until the compositions became uniform. Thereafter, the melted glasses were formed into pellets while being cooled.

Figure 6:
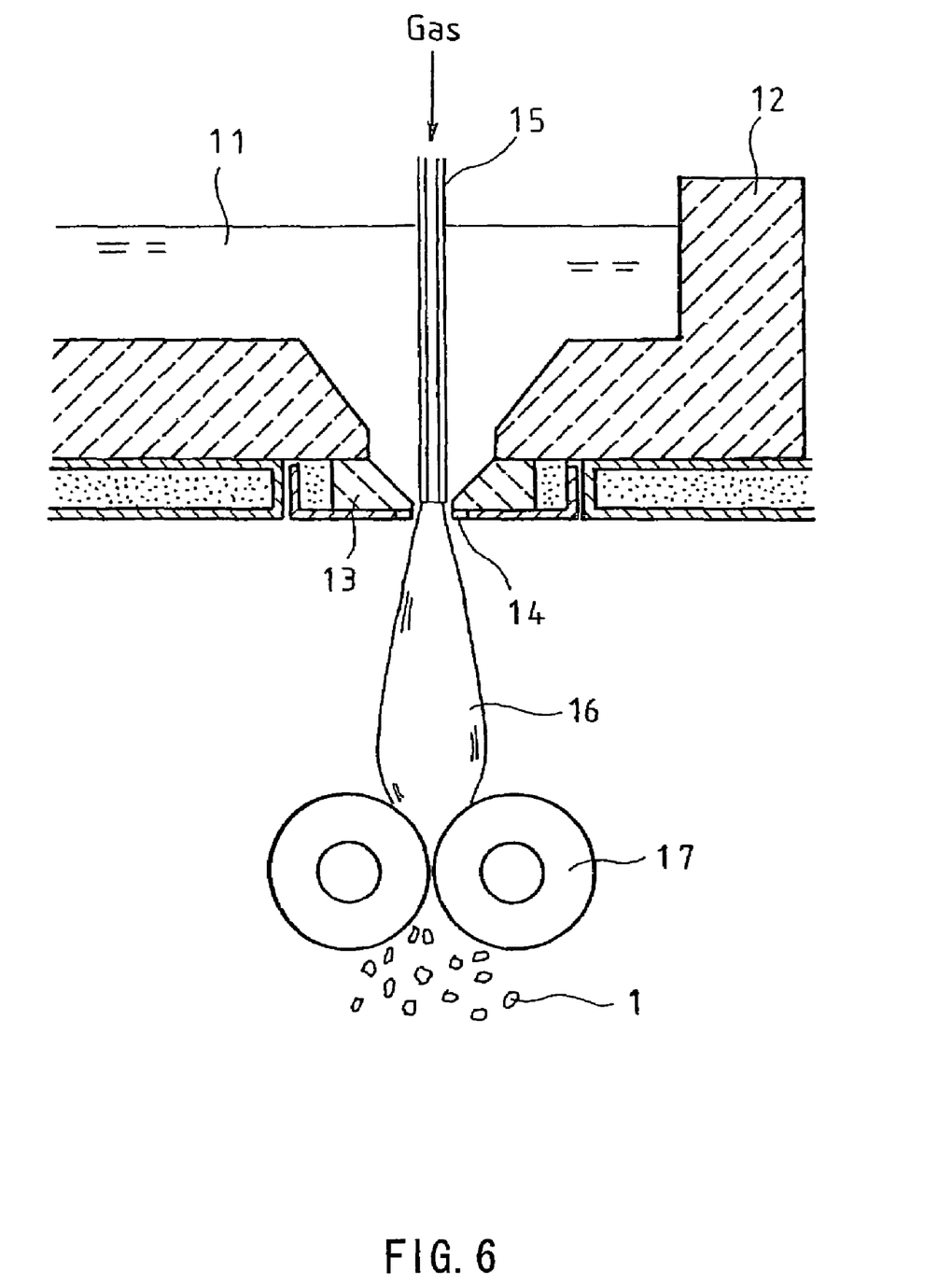
FIG. 6 is a cross-sectional view showing an example of an apparatus for manufacturing glass flakes.

Glass flakes were obtained from the pellets using the apparatus shown in FIG. 6. In this manufacturing apparatus, a feeder block 13 is provided around a bottom opening of a fire-resistant furnace bath 12. The feeder block 13 is supported by a liner 14. A blow nozzle 15 is disposed so that its tip is placed in the vicinity of the opening located around the center of the feeder block 13.

A melted glass material 11 is inflated, into a balloon-like shape, with gas fed into the blow nozzle and is discharged as a hollow glass film 16 from the opening. The hollow glass film 16 is pulverized into glass flakes 1 by pressure rollers 17. In this case, the manufacturing conditions were adjusted suitably so as to allow the glass flakes 1 having an average thickness of 1 μm and those having an average thickness of 15 μm to be obtained. The glass flakes 1 manufactured so as to have an average thickness of 15 μm were used below.

The details of the apparatus for manufacturing glass flakes are described in, for instance, JP5(1993)-826A whose applicant is the present applicant.

In each of Examples 10 to 12, the flake glasses further were subjected to a process in which they were maintained in a heating furnace having a temperature of 800° C. for two hours. The inside of the heating furnace was maintained with an air atmosphere that was an oxidizing atmosphere where Fe was to be oxidized. Thus Fe oxide crystals were formed.

In Example 13, the glass flakes were subjected to a process in which they were maintained in a heating furnace having a temperature of 600° C. for two hours. The inside of the heating furnace was kept to have a 100% nitrogen atmosphere that was an inert atmosphere where Fe was to be reduced. Thus Fe oxide crystals were formed.

In each of Examples 14 and 15, the glass flakes were subjected to a process in which they were maintained in a heating furnace for two hours. The temperature of the heating furnace was 600° C. in Example 14 while being 550° C. in Example 15. The inside of the heating furnace was maintained with an atmosphere of a mixed gas of 3% hydrogen and 97% nitrogen that was a reducing atmosphere where Fe was to be reduced. Thus Fe oxide crystals were formed.

In each of Examples 16 to 18, the glass flakes were subjected to a process in which they were maintained in a heating furnace having a temperature of 700° C. for two hours, with the inside of the heating furnace being kept to have an air atmosphere, and then were maintained in a heating furnace having a temperature of 600° C. for two hours, with the inside of the heating furnace maintained with an atmosphere of a mixed gas of 3% hydrogen and 97% nitrogen. Thus Fe oxide crystals were formed.

In the other examples and comparative examples, the glass flakes were not subjected to the above-mentioned heat treatments.

The glass flakes thus produced were subjected to the measurement of visible-light transmittance using an A light source according to JIS R3106. $Fe^{2+}$ and $Fe^{3+}$ contained in the glass flakes were measured by absorptiometry using o-phenanthroline. Furthermore, in order to check the presence of metal oxide crystals containing Fe as a constituent atom in the glass flakes and further to identify the composition of the crystals, glass flakes and bulk glass having the same glass composition as that of the glass flakes were pulverized and then were subjected to the measurement carried out by powder X-ray diffractomery. In this case, the presence or absence of the metal oxide crystals was judged based on whether a diffraction peak of crystals existed in the X-ray diffraction pattern obtained through the measurement. However, when a trace amount of metal oxide crystals was formed, bulk glass having the same composition as that of the glass flakes was pulverized and then was subjected to the measurement carried out by the powder X-ray diffractomery.

The measurement results were shown in Tables 1 to 3. All the values indicating glass compositions in the tables were expressed in mass %. The iron oxides contained in glass were indicated in terms of $T-Fe_2O_3$.

For instance, when Example 1 and Example 10 are compared to each other, it can be confirmed that the visible-light transmittance of the glass flakes decreases considerably due to the formation of metal oxide crystals.

Comparative Examples 1 and 2 are glass flakes having a C-glass composition and a E-glass composition that have been produced conventionally, respectively. Comparative Example 3 is a glass flake having a composition described in an example of JP3(1991)-40938A. These glass flakes contain a smaller amount of $Fe_2O_3$ and therefore the visible-light absorptivity thereof is not sufficiently high.

TABLE 1

| | Examples | | | | | | | | |
|---|---|---|---|---|---|---|---|---|---|
| | 1 | 2 | 3 | 4 | 5 | 6 | 7 | 8 | 9 |
| $SiO_2$ | 48.3 | 38.3 | 32.3 | 57.1 | 44.9 | 46.4 | 47.2 | 48.1 | 41.6 |
| $Al_2O_3$ | 5.9 | — | — | — | — | 5.6 | 5.7 | — | — |
| $B_2O_3$ | — | 4.0 | — | — | — | — | — | — | — |
| MgO | 6.7 | — | — | — | — | 2.0 | 5.4 | — | — |
| CaO | 13.9 | — | — | — | — | 13.5 | 11.4 | — | — |
| SrO | — | 30.0 | 33.4 | — | — | — | — | — | 25.2 |
| ZnO | — | — | — | — | — | — | — | — | — |
| $Li_2O$ | — | — | — | 2.0 | — | — | — | — | — |
| $Na_2O$ | — | — | — | — | 15.4 | — | — | — | — |
| $K_2O$ | — | — | — | 8.4 | — | — | — | 17.4 | — |
| $T\text{-}Fe_2O_3$ | 25.2 | 27.7 | 34.3 | 32.5 | 39.7 | 24.2 | 24.7 | 29.5 | 27.6 |
| $CeO_2$ | — | — | — | — | — | — | — | — | — |
| $TiO_2$ | — | — | — | — | — | — | 5.6 | 4.9 | — |
| $ZrO_2$ | — | — | — | — | — | — | — | — | 5.7 |
| CoO | — | — | — | — | — | 8.3 | — | — | — |
| $Fe^{2+}/(Fe^{2+}+Fe^{3+})$ | 0.29 | 0.13 | 0.11 | 0.10 | 0.03 | 0.31 | 0.34 | 0.09 | 0.15 |
| Thickness (μm) | 15 | 15 | 15 | 15 | 15 | 15 | 15 | 15 | 15 |
| Visible-Light Trancemittance (%) | 13.0 | 14.1 | 5.2 | 23.4 | 28.5 | 7.8 | 17.7 | 37.9 | 8.5 |
| Color Tone | Brown to Dark Brown | | | | | | | | |

* In Examples 1 to 9, no metal oxide crystals were observed.

TABLE 2

| | Examples | | | | |
|---|---|---|---|---|---|
| | 10 | 11 | 12 | 13 | 14 |
| $SiO_2$ | 48.3 | 32.3 | 44.9 | 48.1 | 48.1 |
| $Al_2O_3$ | 5.9 | — | — | — | — |
| $B_2O_3$ | — | — | — | — | — |
| MgO | 6.7 | — | — | — | — |
| CaO | 13.9 | — | — | — | — |
| SrO | — | 33.4 | — | — | — |
| ZnO | — | — | — | — | — |
| $Li_2O$ | — | — | — | — | — |
| $Na_2O$ | — | — | 15.4 | — | — |
| $K_2O$ | — | — | — | 17.4 | 17.4 |
| $T\text{-}Fe_2O_3$ | 25.2 | 34.3 | 39.7 | 29.5 | 29.5 |
| $CeO_2$ | — | — | — | — | — |
| $TiO_2$ | — | — | — | 4.9 | 4.9 |
| $ZrO_2$ | — | — | — | — | — |
| CoO | — | — | — | — | — |
| $Fe^{2+}/(Fe^{2+}+Fe^{3+})$ | 0.21 | <0.02 | <0.02 | 0.16 | 0.27 |
| Thickness (μm) | 15 | 15 | 15 | 15 | 15 |
| Visible-Light Transmittance (%) | <1.0 | <1.0 | <1.0 | 6.3 | 1.7 |
| Heat Treatment Atmosphere | Oxidizing | Oxidizing | Oxidizing | Inert | Reducing |
| Heat Treatment Temperature (° C.) | 800 | 800 | 800 | 600 | 600 |
| Major Crystals Formed | $Fe_2O_3$ | $Fe_2O_3$ | $Fe_2O_3$ | $Fe_3O_4$ | $Fe_3O_4$ |
| Color Tone | Dark Reddish-Brown to Dark Brown | | | Dark Brown to Black | |

TABLE 3

| | Examples | | | |
|---|---|---|---|---|
| | 15 | 16 | 17 | 18 |
| $SiO_2$ | 45.4 | 52.7 | 55.0 | 55.3 |
| $Al_2O_3$ | 2.6 | 1.3 | 1.3 | — |
| $B_2O_3$ | — | — | — | — |
| MgO | 4.1 | 1.0 | 1.6 | 1.6 |
| CaO | — | — | — | — |
| SrO | — | 18.7 | 16.3 | 16.3 |
| ZnO | — | — | — | — |
| $Li_2O$ | — | — | — | — |
| $Na_2O$ | — | — | — | — |
| $K_2O$ | 17.8 | 4.8 | 4.9 | 4.9 |
| $T\text{-}Fe_2O_3$ | 30.2 | 20.5 | 20.9 | 20.9 |
| $CeO_2$ | — | — | — | — |
| $TiO_2$ | — | 1.0 | — | 1.0 |
| $ZrO_2$ | — | — | — | — |
| CoO | — | — | — | — |
| $Fe^{2+}/(Fe^{2+}+Fe^{3+})$ | 0.42 | 0.17 | 0.09 | 0.10 |
| Thickness (μm) | 15 | 15 | 15 | 15 |
| Visible-Light Transmittance (%) | <1.0 | 33.0 | 36.0 | 44.0 |
| Heat Treatment Atmosphere | Reducing | Oxidizing/Reducing | Oxidizing/Reducing | Oxidizing/Reducing |
| Heat Treatment Temperature (° C.) | 550 | 700/600 | 700/600 | 700/600 |
| Major Crystals Formed | $Fe_3O_4$ | $Fe_3O_4$ | $Fe_3O_4$ | $Fe_3O_4$ |
| Color Tone | Dark Brown to Black | | | |

TABLE 4

| | Comparative Examples | | |
|---|---|---|---|
| | 1 | 2 | 3 |
| $SiO_2$ | 64.6 | 54.2 | 58.2 |
| $Al_2O_3$ | 4.0 | 14.0 | 3.6 |
| $B_2O_3$ | 4.7 | 9.0 | 5.6 |
| MgO | 3.3 | 0.3 | 2.1 |
| CaO | 13.4 | 21.1 | 7.8 |
| SrO | — | — | — |
| BaO | 0.9 | 0.3 | — |
| ZnO | — | — | 5.2 |
| $Li_2O$ | — | — | 0.6 |

TABLE 4-continued

|  | Comparative Examples | | |
| --- | --- | --- | --- |
|  | 1 | 2 | 3 |
| $Na_2O$ |  |  | 6.7 |
| $K_2O$ |  |  | 1.6 |
| $Na_2O + K_2O$ | 9.6 | 0.5 |  |
| $T-Fe_2O_3$ | 0.1 | 0.4 | 6.5 |
| $CeO_2$ | — | — | 2.3 |
| $TiO_2$ | — | — | — |
| $ZrO_2$ | — | — | — |
| CoO | — | — | — |
| Thickness (μm) | 15 | 15 | 15 |
| Visible-Light Transmittance (%) | 92.2 | 91.0 | 86.8 |

* In Comparative Examples 1 to 3, no metal oxide crystals were observed.

The method of determining characteristics of the glass flakes is described supplementally below.

When glass flakes have sufficiently large particle diameters and also have a thickness of more than 15 μm, it is advantageous to adjust the thickness of the glass flakes to 15 μm by, for instance, polishing or etching and then to measure the visible-light transmittance thereof using the A light source. On the other hand, when glass flakes have smaller particle diameters and therefore it is difficult to measure the visible-light transmittance thereof directly, it is advantageous to measure the visible-light transmittance of the glass flakes as follows.

Glass flakes are produced that have the same composition as that of the glass flakes whose visible-light transmittance cannot be measured directly and that have an average thickness of 15 μm and sufficiently large particle diameters. Then the visible-light transmittance thereof is measured using the A light source.

When the particle diameters of glass flakes are too small and thereby it is difficult to measure the visible-light transmittance directly, visible-light transmittance of glass flakes in terms of a thickness of 15 μm may be calculated as follows.

A plane of a glass flake is irradiated with the A light source, with the plane being perpendicular to the light emitted from the A light source. A photo of the glass flake viewed in plan is taken with, for instance, an optical microscope from the side opposite to the light source with respect to the glass flake. The lightness L* of the glass flake is read from the photo. For instance, the photo is converted into an image file on a personal computer, and then the lightness of the glass flake can be read using, for example, an application for editing images. The lightness of a photo obtained when no light source is present is taken as zero while the lightness of a photo obtained when no glass flake is placed and the light source alone is placed is taken as 100. The lightness L* of the glass flake can be converted into Y/Yn according to JIS Z 8729. This Y/Yn is considered as the visible-light transmittance. "Y" denotes a tristimulus value in the XYZ system. "$Y_n$" indicates the value of Y obtained with the standard light of a perfect reflecting diffuser. This operation is carried out with respect to two glass flakes having different thicknesses from each other. Then an approximation formula is made according to the Lambert-Beer's law with respect to the relationship between the thickness and the visible-light transmittance. Thus, the visible-light transmittance in terms of a thickness of 15 μm is calculated.

When it is difficult to measure the thickness of a glass flake directly, it is preferable that a cross-sectional photo of the glass flake be taken with, for instance, an electron microscope and then the thickness of the glass flake be read therefrom.

INDUSTRIAL APPLICABILITY

As described above, the glass flakes of the present invention exhibit such high visible-light absorptivity as to be incomparable with conventional ones. A pigment including the glass flakes having a coating film formed thereon tends not to be affected by the color of the surface of a substrate on which the pigment is applied, and therefore is excellent in color development property. Moreover, resin compositions, paints, and cosmetics that contain the glass flakes are excellent in color tone and glossiness.

The invention claimed is:

1. A glass flake, comprising a glass composition, the glass composition comprising at least 18 mass % of a transition metal oxide and allowing the glass flake to have a visible-light transmittance of 85% or lower measured with an A light source when the glass flake has a thickness of 15 μm, wherein the glass flake is free from a metal oxide crystal that contains Fe as a constituent atom.

2. The glass flake according to claim 1, wherein the glass composition further comprises $SiO_2$ and an alkali metal oxide.

3. The glass flake according to claim 2, wherein the glass composition comprises the following components, expressed in mass %:
   $20 \leq SiO_2 \leq 70$;
   $18 < T-Fe_2O_3 \leq 50$; and
   $5 \leq (Li_2O+Na_2O+K_2O) \leq 50$,
   where the $T-Fe_2O_3$ denotes $Fe_2O_3$ whose amount is calculated from the total content of iron contained in the glass composition.

4. The glass flake according to claim 1, wherein the glass composition further comprises $SiO_2$ and an alkaline-earth metal oxide.

5. The glass flake according to claim 4, wherein the glass composition comprises the following components, expressed in mass %:
   $20 \leq SiO_2 \leq 70$;
   $18 \leq T-Fe_2O_3 \leq 50$; and
   $5 \leq (MgO+CaO+SrO) \leq 50$,
   where the $T-Fe_2O_3$ denotes $Fe_2O_3$ whose amount is calculated from the total content of iron contained in the glass composition.

6. The glass flake according to claim 1, wherein the glass composition further comprises $SiO_2$, an alkali metal oxide, and an alkaline-earth metal oxide.

7. The glass flake according to claim 6, wherein the glass composition comprises the following components, expressed in mass %:
   $20 \leq SiO_2 \leq 70$;
   $18 \leq T-Fe_2O_3 \leq 50$;
   $0 < (Li_2O+Na_2O+K_2O) < 50$;
   $0 < (MgO+CaO+SrO) < 50$; and
   $5 \leq (Li_2O+Na_2O+K_2O+MgO+CaO+SrO) \leq 50$,
   where the $T-Fe_2O_3$ denotes $Fe_2O_3$ whose amount is calculated from the total content of iron contained in the glass composition.

8. The glass flake according to claim 1, wherein the glass composition comprises an oxide of Fe as the transition metal oxide, and the Fe satisfies a formula of $0.05 \leq Fe^{2+}/(Fe^{2+}+Fe^{3+}) < 1.00$.

9. The glass flake according to claim 8, wherein the Fe satisfies a formula of $0.10 \leq Fe^{2+}/(Fe^{2+}+Fe^{3+}) \leq 0.80$.

10. The glass flake according to claim 1, further comprising a coating film that is formed on a surface of the glass flake and contains at least one selected from a metal and a metal oxide.

11. The glass flake according to claim 10, wherein the metal is at least one selected from the group consisting of nickel, gold, silver, platinum, and palladium.

12. The glass flake according to claim 10, wherein the metal oxide is an oxide of at least one selected from the group consisting of titanium, aluminum, iron, cobalt, chromium, zirconium, zinc, and tin.

13. A resin composition comprising a glass flake according to claim 1.

14. A paint comprising a glass flake according to claim 1.

15. A cosmetic product comprising a glass flake according to claim 1.

16. A glass flake, comprising a glass composition, the glass composition comprising at least 18 mass % of a transition metal oxide and allowing the glass flake to have a visible-light transmission of 85% or lower measured with a A light source when the glass flake has a thickness of 15 μm, wherein Fe contained in the glass flake satisfies a formula of $0.05 \leq (Fe^{2+}/Fe^{2+}+Fe^{3+}) < 1.00$.

* * * * *

UNITED STATES PATENT AND TRADEMARK OFFICE
CERTIFICATE OF CORRECTION

PATENT NO. : 7,641,730 B2
APPLICATION NO. : 10/541602
DATED : January 5, 2010
INVENTOR(S) : Fujiwara et al.

It is certified that error appears in the above-identified patent and that said Letters Patent is hereby corrected as shown below:

Column 12, line 27: "$18<T\text{-}Fe_2O_3\leq 50$; and" should be "$18\leq T\text{-}Fe_2O_3\leq 50$; and"

Signed and Sealed this

First Day of June, 2010

David J. Kappos
*Director of the United States Patent and Trademark Office*